Nov. 27, 1951  F. L. MOSELEY  2,576,135
RADIO CONTROLLED PILOT SYSTEM
Filed June 28, 1944  5 Sheets-Sheet 1
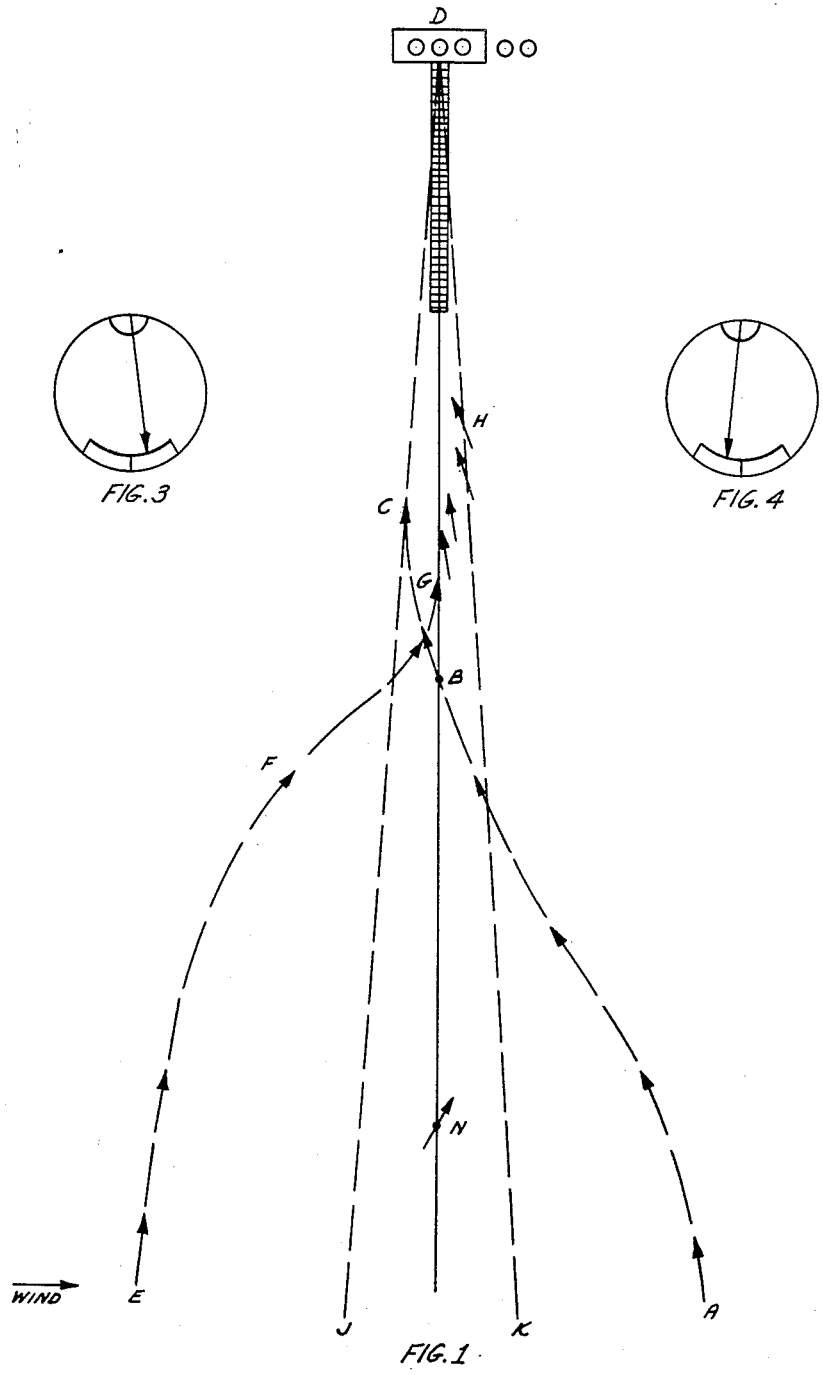
INVENTOR.
FRANCIS L. MOSELEY
BY William D Hall.
ATTORNEY.

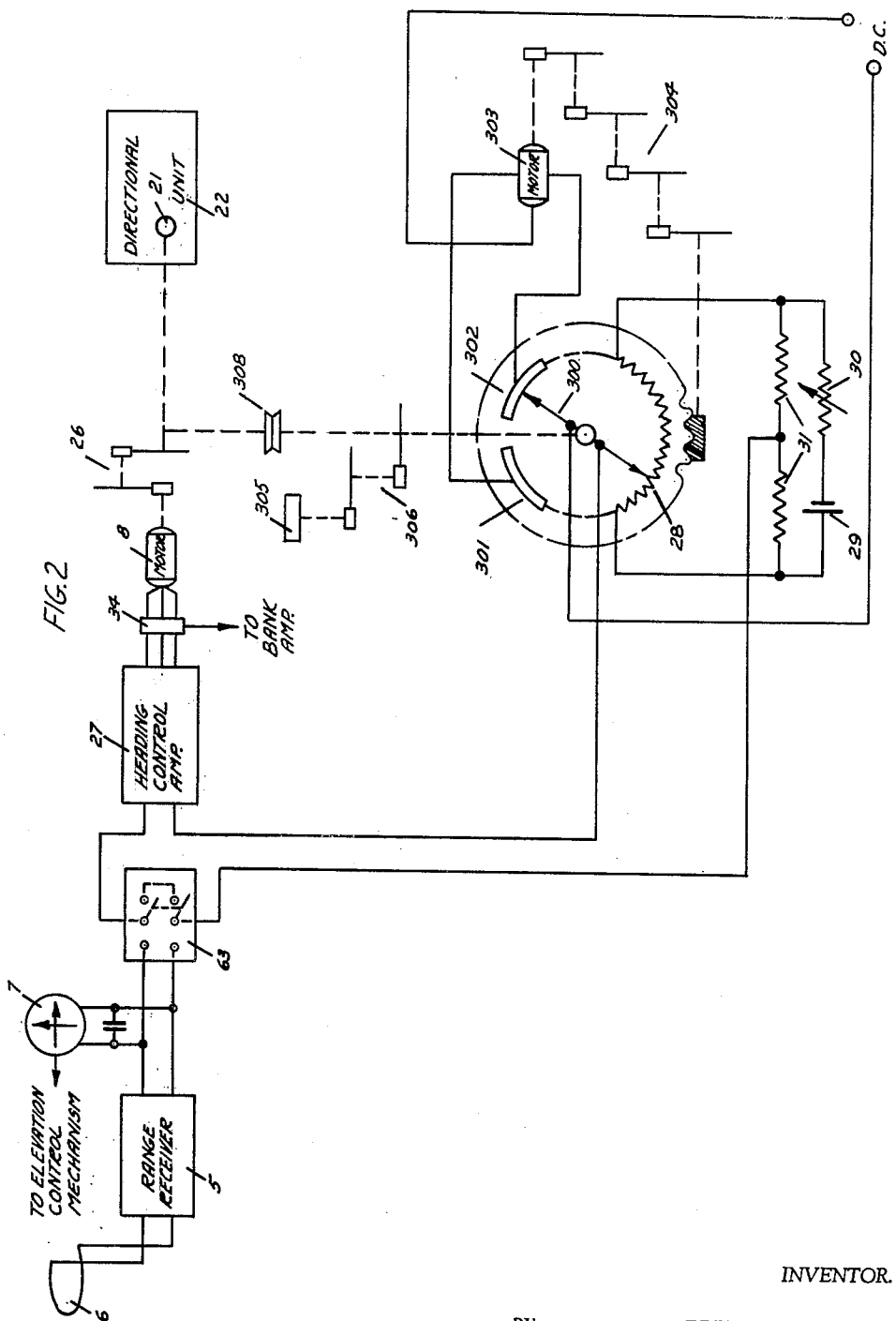

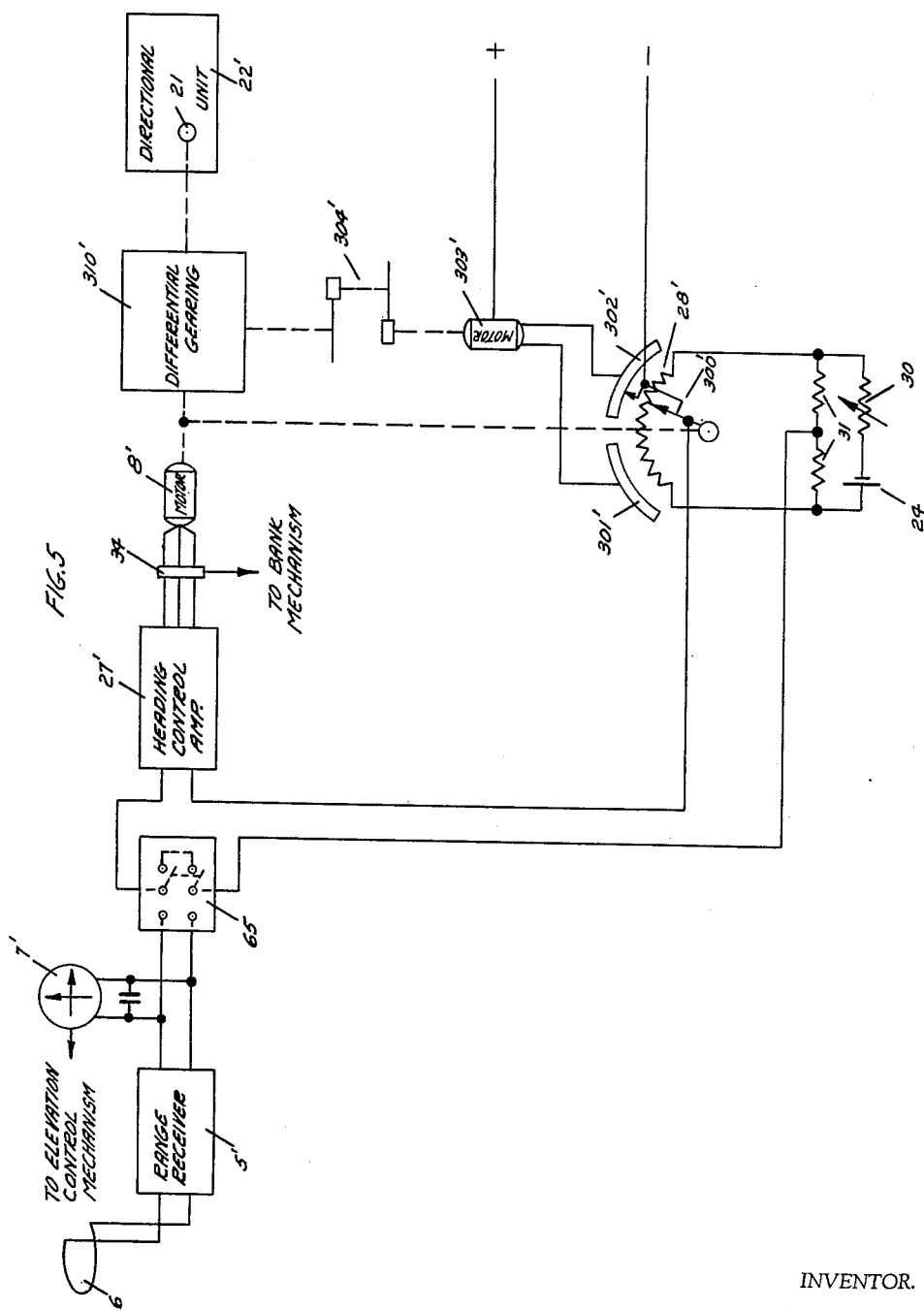

Nov. 27, 1951   F. L. MOSELEY   2,576,135
RADIO CONTROLLED PILOT SYSTEM
Filed June 28, 1944   5 Sheets-Sheet 4
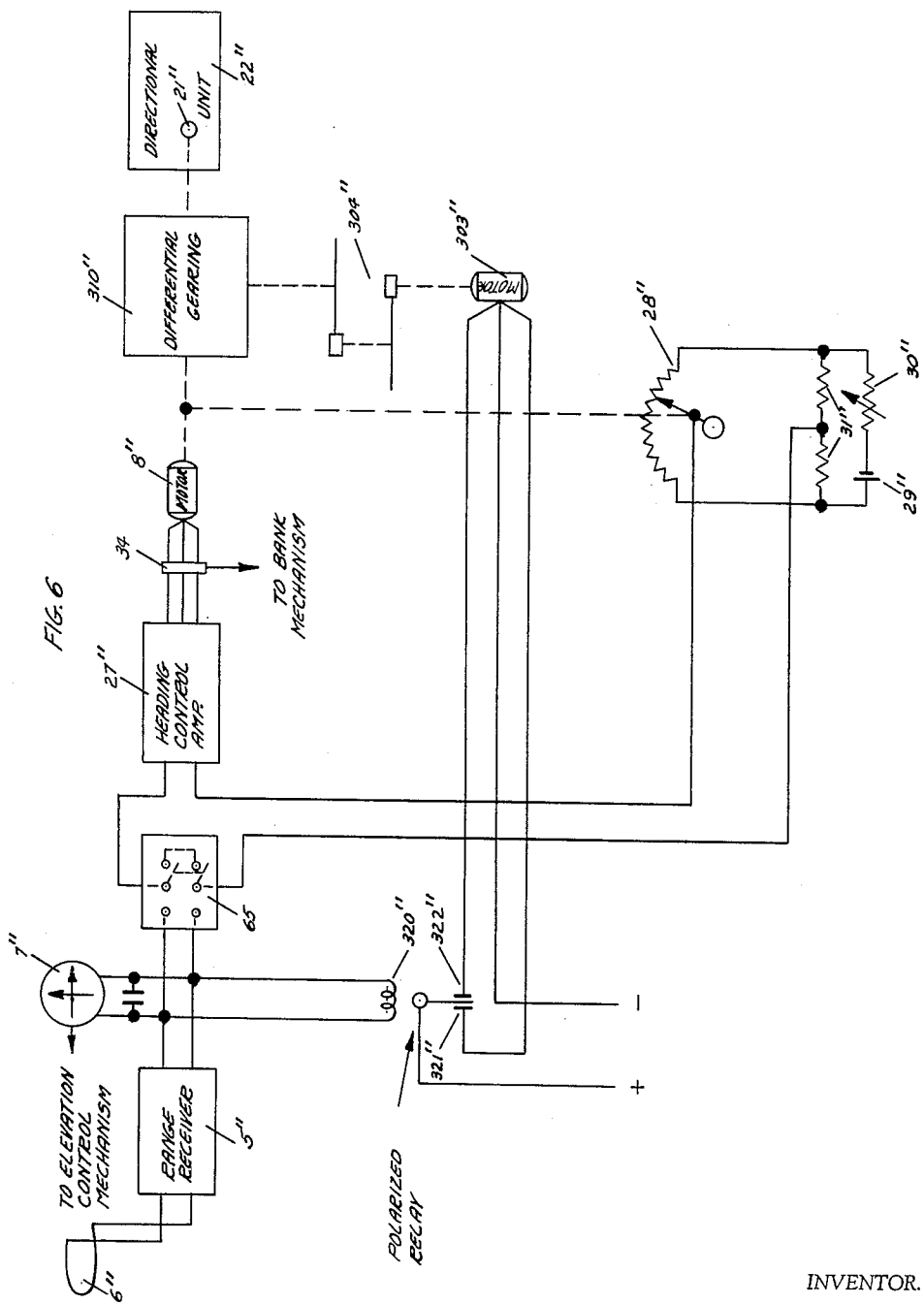
INVENTOR.
FRANCIS L. MOSELEY
BY William D. Hall
ATTORNEY.

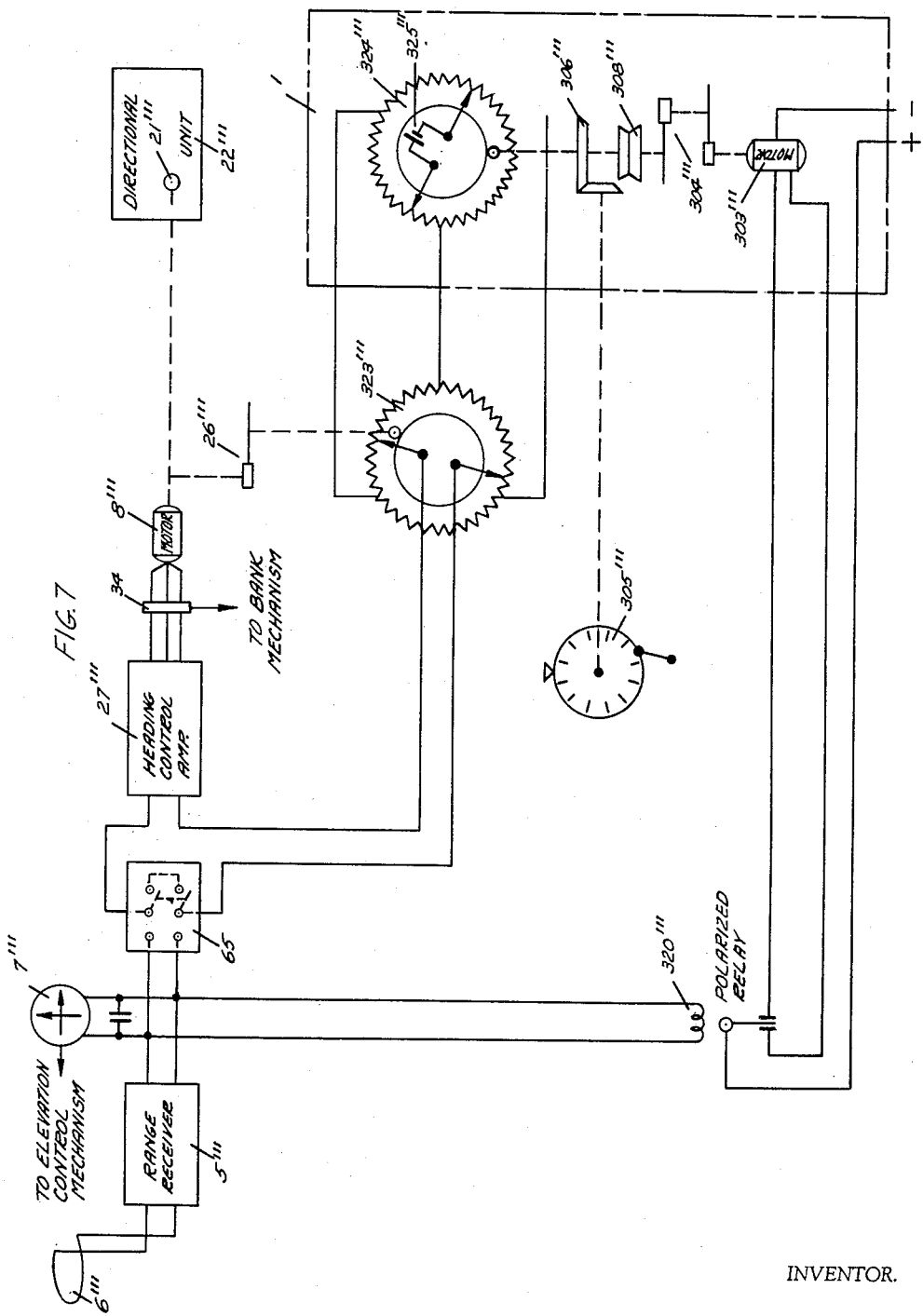

Patented Nov. 27, 1951

2,576,135

UNITED STATES PATENT OFFICE 2,576,135

RADIO CONTROLLED PILOT SYSTEM

Francis L. Moseley, Osborn, Ohio, assignor to Collins Radio Company, Cedar Rapids, Iowa, a corporation of Iowa Application June 28, 1944, Serial No. 542,594

16 Claims. (Cl. 244—77)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to automatic flight control of aircraft on radio ranges or localizers utilized to guide aircraft to a landing strip or runway, or for other purposes, and is an improvement upon the inventions set forth in my prior co-pending applications, Serial No. 378,296, filed February 10, 1941, and Serial No. 505,917, filed October 12, 1943, which have matured into Patents 2,423,336 and 2,496,809, respectively.

In the above applications a localizer employing overlapping field patterns defining an equi-signal plane or line between such patterns indicating the course to the landing strip is provided. This is accomplished by modulating transmitters with different frequencies, such as 90 and 150 cycles, on each side of the course. It also utilizes radio transmitters provided with suitable antennae setting up a radiation pattern along a line suitable for employment as a glide path to the landing end of the runway. The direction of the aircraft is controlled by a positional signal obtained from a radio receiver which varies in amplitude and polarity according to the amount of departure of the aircraft from the course, as defined by the above plane or line. Normally, this signal will result in a small direct current voltage which is fed into a heading control amplifier in opposite relation to a follow-up signal. The amplifier, in turn, feeds means for actuating the gyro system of a suitable automatic pilot to change the direction of travel of the aircraft. This actuating means also controls the magnitude of the follow-up signal which measures the directional correction through which the aircraft is turned and is proportional to the action of the actuating means. When the magnitude of the follow-up signal reaches that of the positional signal, they balance out and the means for actuating the gyro system comes to rest or ceases to function. In this way the aircraft is steered automatically into and along a flight path which is coincident with that of the equi-signal plane or line marking the radio defined course.

In flying a radio range or localizer with the systems disclosed in the above applications, it is necessary to set the aircraft initially exactly parallel to the published heading of such localizer or range prior to switching on the automatic control. The action of the automatic control will then be to bring the aircraft on to course, as shown in the drawings of the above applications. When the aircraft reaches the on course position, it will have turned back to exactly the original heading, and if this original heading were not precisely the runway heading, the aircraft would then fly off course until a restoring signal was encountered having a value sufficiently great to turn the aircraft back towards the course the required amount. A balance would thus be established and the aircraft would fly in toward the station along a line which would converge upon but would not be coincident with the course line.

Now if the heading of the aircraft is at an angle away from the course line, as distinguished from being parallel to or at an angle toward the course line, the correction introduced by the positioning signal could never be sufficient to bring the aircraft on to course. The greater the angle of heading away from course, the further the aircraft will deviate from the course line in approaching the localizer. The correction introduced by the positioning signal is proportional to its differential strength and this, in turn, is proportional to the distance of the aircraft away from the course line on either side thereof. It has no necessary relation to heading. However, the reference line selected was a line parallel to course line, so that when the heading of the aircraft is away from course, the positioning signal, which overcomes the follow-up signal, is not sufficiently great to return the plane to course. On the other hand, if the plane is headed toward the course line, the positioning signal will decrease as the aircraft approaches course and the follow-up signal will balance it out, so that the plane can return to course and will cross it.

Another requirement for correct flying along the course is constancy of the directional reference in the aircraft. The gyro in the above applications, which serves as the directional reference, is subject to drift. This introduces an error which is similar to that caused by initial incorrect heading setting. The effect of a crosswind is likewise of such nature, forcing the aircraft to fly a line converging on the course line, but far enough displaced from course to obtain sufficient departure signal to cause the aircraft to head back toward the course and into the wind. The aircraft then proceeds down the line and it reaches the localizer station but may fail to pass over the landing end of the runway.

Applicant, with the knowledge of the effects of wind, initial incorrect heading and setting, and gyro drift causing the aircraft to seek and fly a line which is not coincident with the course line, has for an object of his invention the provision of a system for automatically controlling the course of aircraft which corrects for the above factors and which will cause the aircraft to fly the course.

Applicant has as another object of his invention the provision of a system responsive to an off course position for inserting a slow correction toward course, which correction is continuously inserted until the aircraft reaches the on course line.

Applicant has as another object of his invention the provision of a system responsive to an off course position for introducing a correction to return the aircraft back to the course line, and establish a heading which will cause the aircraft to fly in a direction which is sufficient to maintain itself on course and compensate for the effects of wind and/or other factors tending to move it off course.

Applicant has as a further object of his invention the provision of a system for automatically steering aircraft on to a flight path coincident with a predetermined course defined by positional radio signals, taking into account the effects of winds, initial off course setting and heading, and gyro drift.

Applicant has as a still further object of his invention the provision of a system for automatically maintaining an aircraft on a flight path coincident with a predetermined course defined by positional radio signals, taking into account the effects of winds, and other changing factors.

Other objects and advantages of his invention will appear from the following specification and accompanying drawings, and the novel features thereof will be particularly pointed out in the annexed claims.

In the drawing,

Fig. 1 illustrates the flight path of aircraft steered under automatic controlling devices with and without applicant's improvement;

Fig. 2 represents a block diagram showing the invention applied to the steering mechanism of an aircraft;

Fig. 3 shows the position of the cross-pointer meter when the aircraft is on one side of the course line;

Fig. 4 shows the cross-pointer meter when the aircraft is flying on the other side of the course line;

Fig. 5 is a modified form of the invention applied to the directional gyro of an aircraft;

Fig. 6 is a further modified form of the invention applied to the directional gyro of an aircraft; and Fig. 7 is a still further modified form of the invention applied to the directional gyro of an aircraft.

Referring to the drawings in detail, Fig. 1 illustrates the flight paths of an aircraft with and without my new improved system of flight control. First, consider an aircraft starting from point A, controlled by a system of the character disclosed in my prior co-pending applications. Where the plane is not headed parallel to the course line, it will fly under control of the automatic flight control system until it reaches point B on the course line, at which point it will return to its original heading, which is seen to be parallel to that established at point A, but not parallel to the course line. As the aircraft cannot remain on the course in still air with this heading, it will fly to the left of the course line into a region of signal from the localizer, causing it to turn right and head back toward the course line, finally reaching a condition of balance at point C. The aircraft then continues on the line CD, which causes it to reach the localizer station but may permit it to miss the approach end of the runway.

Again referring to Fig. 1, an aircraft utilizing the same system of automatic control, as set forth in my prior co-pending applications, starts at point E, but this time headed parallel to the course line. Assuming the aircraft is flying in a crosswind, as indicated, the aircraft follows the path EFGH. At point G the aircraft is on course and has returned to a heading parallel to its originally set heading at point E. Due to the presence of crosswind, however, the aircraft cannot remain on course at G with a heading parallel to the course, and it is consequently blown off course to point H where it receives an amount of off course signal sufficient to cause it to turn the left into the wind to a condition of balance. The aircraft then proceeds down the line DH until it reaches the localizer station, but would fail to pass over the landing end of the runway.

As indicated, the effects of wind, initial incorrect heading setting, and gyro drift will result in the aircraft seeking and flying a line which produces a balance between all factors and such is not coincident with the course line. It will be noted from an inspection of Fig. 1 that lines JCD and KHD, which represent lines of balance produced by some error condition, are off course, and that an aircraft flying one of these lines is receiving a continuous off course signal from the cross-pointer meter or other indicating devices. The indications received on the vertical needle of the cross-pointer instrument in the aircraft on line JD are shown in Figure 3, while those for KD are shown in Figure 4. From this it is apparent that the indicator needle is telling the pilot that the aircraft is continuously flying an incorrect line, and that an increase of heading angle with respect to course is required.

The system of Figure 2 takes account of this continuous off-center indication and inserts a slow correction toward course, which correction is continuously inserted until the aircraft reaches the on course line. The slow heading changing mechanism selects a series of lines similar to JCD, but each time the line selected is progressively closer to course. The diagram of Figure 2 shows only that part of the automatic control system which provides the heading control for the aircraft, while other points of the system are omitted, since they conform to those disclosed in my prior co-pending applications.

In Figure 2 there is shown at 5 a radio range or localizer receiver provided with an antenna 6 for receiving the doubly modulated radiation field previously referred to. This receiver is well-known in the art, being customarily utilized to operate the vertical needle of the cross-pointer instrument 7 for the purpose of giving the pilot a visual indication of his position relative to the course, and is described in my prior co-pending applications. The output of the range receiver is employed to operate the heading control motor 8. This motor controls the direction of the aircraft in a horizontal plane through the action of the rudder. To obtain the desired actuation of the rudder under control of motor 8, use is made of the automatic pilot provided in the aircraft. A gyroscopic automatic pilot of the type described in Patent 1,992,970, March 5, 1935, is particularly well adapted to such purpose, although this invention is not limited to use with that particular automatic pilot. That type of automatic pilot is well-known in the art, but its application to this purpose is particularly well described in my two prior co-pending applications.

As shown in Figure 2, motor 8 is provided with reduction gearing 26 and is operatively connected with the heading control 21 of the directional gyro pilot unit 22 which, in turn, controls the movement and operation of the rudder of the aircraft. In order to obtain more output for the control motor 8, a heading control amplifier 27 is provided for amplifying the output of the radio range receiver 5. Also to insure a heading correction proportional to the departure of the aircraft, it is necessary to proportion the operation of the turn control motor 8 to the amplitude of the positional signal from the radio range receiver 5. In this arrangement the positional signal is opposed by a follow-up signal, which measures the directional correction through which the aircraft is turned under operation of the motor. For this purpose it is convenient to employ a potentiometer 28 in the circuit shown with battery 29, adjustable resistance 30 and center-tapped resistance 31, to form a bridge. As shown the arm or slide of the potentiometer is operatively connected to turn motor 8 and functions to supply the heading control amplifier 27 with a voltage proportional to the heading correction bucking the positional signal from the radio range receiver 5. This is done by upsetting the balance of the bridge. In this connection it will be noted that switch 63, preferably double pole, double throw, is interposed between range receiver 5 and heading control amplifier 27 for disconnecting the automatic heading control system when not desired to be used. Under control of this circuit, turn motor 8 operates to change the heading of the aircraft only until the follow-up bucking voltage becomes equal and opposite to the positional signal and thereby effects a heading correction proportional to the departure from a line parallel to course, as described in detail in said co-pending applications.

The foregoing takes account of the fact that the balancing potentiometer 28 is a power follow-up on the cross-pointer instrument 7. In one form of this invention, the shaft of potentiometer 28 is provided with auxiliary contact arm 300, which makes contact with sector 301 or sector 302 whenever the potentiometer is at a position other than balance, but does not make contact with the resistance element of such potentiometer. Motor 303 is of a reversible type and is rotated in either direction depending upon whether contact is made by auxiliary contact arm 300 with sector 301 or sector 302. Motor 303 preferably drives the case or resistance and sector elements of potentiometer 28 through any conventional gear train 304. The rate at which the potentiometer case or resistance and sector elements are driven is preferably approximately one-tenth ($\frac{1}{10}$) the rate at which the main course changing motor 8 operates, in order to prevent over correction of course heading. The correcting motor 303 therefore slowly selects a series of new course lines by moving the resistance element and sectors of potentiometer 28 in such a direction as to reduce the follow-up voltage. This has the effect of bringing the aircraft back on course even where it had an initial heading at an angle away from the course, by permitting the positioning signal to accomplish an increased turn in the heading of the aircraft toward the course line. When the aircraft finally reaches the on course line, cross-pointer meter comes to center, potentiometer 28 returns to center, and auxiliary arm 300 centers between sector 301 and sector 302, thus stopping motor 303.

It may be seen that when the automatic control is switched on, the positioning signal passes through range receiver 5 and into heading control amplifier 27. If the aircraft is off course, the positioning signal will operate motor 8 and change the gyro pilot 22, moving the rudder and changing the course. Motor 8 then moves the potentiometer arms so that the bridge 28, 31, 31 is unbalanced to the point where the follow-up signal balances the positioning signal and the motor stops. This movement of the potentiometer arm brings auxiliary arm 300 into contact with either sector 301 or 302 and the motor 303, acting through gear train 304, moves sectors 301 and 302 and resistance elements of potentiometer 28 to a position which will reduce the follow-up signal, create an unbalance between the positioning and follow-up signals, and cause the motor 8 to select a new heading. This process continues until the bridge circuit is finally balanced and no follow-up signal is available. At this point the potentiometer arm is in the center and the auxiliary arm 300 is between sectors 301 and 302. A complete condition of balance has been reached, the aircraft is on course, and, where wind is involved, a heading has been established which will cause the aircraft to fly into the wind by an amount just sufficient to maintain itself on course and the aircraft proceeds down the course line at an angle as shown at Position N of Figure 1.

Referring again to Figure 2, knob 305 is connected through gear train 306 to shaft 307. This shaft is separated from the main gyro control shaft by a conventional friction clutch 308. It is thus possible, through motion of knob 5, to shift the balance point of potentiometer 28 with respect to the gyro heading. This factor permits initial alignment of the aircraft to any desired heading and likewise furnishes the pilot with a maneuvering control which permits him to fly his aircraft through the medium of the automatic system prior to connecting the automatic control to the source of radio signals through switch 63.

Figure 5 shows a modification of this invention. In this modification the motor 303' is employed to actuate differential gearing 310' instead of employing the motor 303' to change the setting of the potentiometer 28' to accomplish a change in course. The system contemplates the use of the range receiver 5' and cross-pointer meter 7' feeding into amplifier 27', just as in Figure 2. The heading control amplifier feeds into motor 8' which controls the potentiometer 28' of the bridge, as previously described. Instead, however, of the motor 8' directly controlling the operation of directional gyro 22', it acts through differential gearing 310' to accomplish this purpose. The other shaft of differential gearing 310' is connected through gear train 304' to motor 303', operated by auxiliary contact arm 300' and sector 301' and sector 302' on the potentiometer.

When the automatic course control is switched on and the aircraft is to one side or the other of the course line, a positioning signal from the range receiver 5' and amplifier 27' causes motor 8' to act through differential gearing 310' to change the heading of the plane, altering the potentiometer and bridge setting and bringing auxiliary arm 300' into contact with either sector 301' or 302'. Then motor 303', acting slowly through its gear train 304', still further alters the heading of the plane through its operation of differential gear 310' upon directional gyro control 22'. This action of slowly selecting new balance lines contines, but as the aircraft approaches the course line, the positioning signal diminishes and the motor 8' moves back under the influence of the follow-up voltage, returning the potentiometer to center condition and operating differential gear 310' to alter the heading of the plane.

Another modification of this invention is disclosed in Figure 6 with the antenna shown at 6'', the radio range receiver at 5'', and the cross-pointer instrument at 7''. The output of the radio range receiver 5'' feeds into heading control amplifier 27'', which, in turn, feeds motor 8'', for driving conventional differential gearing 310'', which, in turn, operates the control 21'' of the directional gyro 22''. Connected across the cross-pointer instrument 7'', is the winding of a polarized relay 320'' which has a pointer that moves against contacts 321'' and 322'' in response to the currents which actuate cross-pointer instrument 7'' on one side or the other of the vertical line, so that when such currents move the vertical needle of the cross pointer instrument 7'' to one side or the other of the vertical line, the pointer of the relay 320'' is likewise moved against one or the other of contacts 321'', 322'', depending upon the direction of the currents. This relay serves to close the circuit leading to reversible motor 303'', similar to those previously described in connection with the foregoing modifications herein. The motor 303'' serves to drive a conventional differential gear arrangement through gear train 304'', connected to one of its three shafts. Another of the shafts of differential gearing 310'' is connected to motor 8'', which also drives the shaft of potentiometer 28'' to upset or restore the balance of bridge 28'', 29'', 30'' and 31'', as previously described in connection with other modifications. The third shaft of differential gearing 310'' is connected to the control 21'' of directional gyro 22'', as previously described in connection with the foregoing modifications herein. The operation of this system is similar to that disclosed in Figure 5, with the exception that the control means for reversible motor 303'' is independent of potentiometer 28'', and is operated by the relay 320''. Signals coming out of antenna 6'' operate radio range receiver 5'' and the resulting output is fed to relay 320'' as well as heading control amplifier 27''. If the aircraft is to one side or the other of the course, the voltage will be applied to relay 320'' from radio range receiver 5'' which will cause its pointer or contact arm to engage either contact 321'' or contact 322'' according to the polarity of the output from the radio range receiver 5''. As previously described, motor 303'' is actuated and serves to drive differential gear 310'' through gear train 304''. As previously described in connection with previous modifications herein, a slow correction is introduced from motor 303'' to alter the heading of the plane and bring it on the course. The bridge network 28'', 29'', 30'' and 31'' acts in exactly the same manner as previously described in connection with the other modifications. Figure 7 shows a still further form of the invention. The system therein disclosed employs a polarized relay 320''', similar to the one disclosed in the system of Figure 6. The radio range receiver 5''' is fed by antenna 6''' and, in turn, feeds cross-pointer instrument 7''' and heading control amplifier 27'''. The output of amplifier 27''' then feeds motor 8''', which drives directional gyro control 22''' through control element 21''', and also drives potentiometer 323''' through gear train 26'''. Potentiometer 324''' is controlled through the medium of polarized relay 320''', reversible motor 303''' and gear train 304''', in a manner described in connection with the preceding figure. A conventional friction clutch 308''' is interposed between gear train 304''' and potentiometer 324''' in the drive thereof. A manual control 305''' is also provided, as in Figure 2, for acting through gear mechanism 306''' to actuate the potentiometer 324'''.

This system comprehends the use of two potentiometers 323''' and 324''' having continuous windings. The three terminals of the potentiometers are joined to form a bridge with battery or D.-C. source 325''', which feeds energy into the contact arms of potentiometer 324'''.

As the arms of potentiometer 323''' and 324''' are moved from position to position under the influence of their respective motors 8''' and 303''', the bridge is either brought into or thrown out of balance, causing the follow-up voltage introduced in heading control amplifier 27''' to change and the motor 8''' to be actuated as a result thereof and in a manner similar to those discussed in connection with the modification of Figure 2. The gear ratio between gear train 304''' and gear train 26''' is such that the change in potentiometer setting of potentiometer 324''' is very slow in comparison to that of potentiometer 323''', for reasons previously indicated in connection with the foregoing systems.

Since the bank control mechanism and the elevation control mechanism form no part of this invention, and since same may be used with such systems of conventional character or with those disclosed in my co-pending applications, or even without such systems, details of these systems have been omitted from this application for purposes of clarity.

Having thus described my invention, I claim:

1. An aircraft flight control system comprising a radio range receiver for receiving radio defined course positioning signals, means responsive to the positioning signals from the receiver for controlling the direction of flight of an aircraft, follow-up means controlled by said first means operative to supply a follow-up signal to said first means proportional to the action thereof and in opposed relation to the positioning signal, and means responsive to the positioning signal for changing the magnitude of the follow-up signal to further alter the direction of flight of the aircraft.

2. An aircraft flight control system comprising a radio range receiver for receiving radio defined course positioning signals, means responsive to the positioning signal from the receiver for controlling the direction of flight of an aircraft along the course determined by said signals, follow-up means including a bridge whose balance is controlled by said first means operative to supply a follow-up signal to said first means proportional to the action thereof and in opposed relation to the positioning signal, and means responsive to the condition of unbalance of said bridge for further altering the balance thereof to change the follow-up signal and the direction of flight of the plane.

3. An aircraft flight control system comprising a radio range receiver for receiving radio defined course positioning signals, means responsive to the positioning signals from the receiver for controlling the direction of flight of an aircraft along the course determined by said signals, follow-up means including a bridge whose balance is controlled by said first means operative to supply a follow-up signal to said first means proportional to the action thereof and in opposed relation to the positioning signal, and means responsive to the condition of unbalance of said bridge for independently altering the direction of flight of an aircraft.

4. An aircraft flight control system comprising a radio range receiver for receiving radio defined course positioning signals, a motor responsive to the positioning signals from the receiver for controlling the direction of flight of an aircraft through its directional control equipment, a differential gear interposed between said motor to said equipment, follow-up means including a bridge whose balance is controlled by said motor operative to supply a follow-up signal to said first means proportional to the action thereof and in opposed relation to the positioning signal, and means responsive to the condition of unbalance of said bridge and operating on said differential gear to independently alter the position of said control equipment for changing the course of the aircraft.

5. An aircraft flight control system comprising a radio range receiver for receiving radio defined course positioning signals, means responsive to the positioning signals from the receiver for controlling the direction of flight of the aircraft along the course determined by said signals, follow-up means including a bridge whose balance is partially controlled by said first means operative to supply a follow-up signal to said first means in opposed relation to the positioning signal, and additional means responsive to said positioning signal from the receiver and acting on said bridge to further alter its circuit values and partially control the follow-up signal to independently alter the direction of flight of the aircraft.

6. An aircraft flight control system comprising electric motor means for controlling the setting of a heading control member on the aircraft and responsive to a received input control signal which is proportional to the lateral displacement of the aircraft from a predetermined course line, signal input circuit means responsive to the said control signal to control the direction of flight of the aircraft, follow-up means operated by said motor means operative to supply a follow-up signal to the signal input means and in opposition to the said input control signal, and other electric motor means responsive to the control signal for progressively changing the direction of flight of the aircraft until it is headed on said course line.

7. An aircraft flight control system comprising a radio range receiver for receiving positioning signals, electric motor means responsive to the positioning signals from the receiver for controlling the direction of flight of an aircraft through the directional flight equipment on the aircraft, a differential gear interposed between said motor and said equipment, follow-up means controlled by said electric motor means for producing an electric follow-up signal whose amplitude varies as the aircraft approaches a predetermined course line, circuit means to combine said follow-up signal in opposed relation to the positioning signal to produce a resultant heading control signal, and means responsive to said positioning signal for independently acting on said differential gear to change the setting of said flight equipment until the aircraft is headed on said course.

8. A radio guide system for mobile craft, comprising, a radio receiver for producing departure control signals which are continuously variable as the craft departs from a predetermined radio defined course line, a directional control device on the craft responsive to said signals, means to produce another electric signal in proportion to the change of heading of the craft with respect to said course line, means to balance said signals to produce a resultant signal said balancing means including a bridge having an adjustable ratio arm which is moved in timed relation with and in proportion to the extent to which said departure is reduced until both signals are of equal magnitude, and means to apply said resultant signal to continuously control said device until the craft is headed on said course.

9. A radio guide system for mobile craft, comprising, a radio receiver for producing departure control signals which are continuously variable as the craft departs from a predetermined radio defined course line, a directional control device on the craft responsive to said signals, means to produce another electric signal in proportion to the change of heading of the craft with respect to said course line, means to balance said signals to produce a resultant signal said balancing means including a bridge having a movable ratio arm which is moved in proportion to the first signal to unbalance the bridge, and means to move said arm in the opposite direction until the bridge is rebalanced.

10. A radio guide system for mobile craft, comprising, a radio receiver for producing departure control signals which are continuously variable as the craft departs from a predetermined radio defined course line said departure control signals being of variable amplitude in accordance with the extent of said departure and of opposite polarity in accordance with the direction of said departure with respect to said course line, a directional control device on the craft responsive to said signals, means to produce another electric signal in proportion to the change of heading of the craft with respect to said course line, means to balance said signals to produce a resultant signal and comprising a polarized relay controlled by said departure control signals, a reversible motor controlled by said polarized relay, a balancing bridge having an adjustable ratio arm operated by said motor, and means to apply said resultant signal to continuously control said device until the craft is headed on said course.

11. A radio guide system for mobile craft, comprising, a radio receiver for producing departure control signals which are continuously variable as the craft departs from a predetermined radio defined course line, a directional control device on the craft responsive to said signals, means to produce another electric signal in proportion to the change of heading of the craft with respect to said course line, means to balance said signals to produce a resultant signal, means to apply said resultant signal to continuously control said device until the craft is headed on said course, said means for producing said other signal including a balancing bridge having means to unbalance it in response to an initial automatic setting of said directional control device and then to automatically rebalance it when the craft reaches a certain heading with respect to said course line.

12. A radio guide system for mobile craft such as aircraft and the like, comprising in combination, means to set up a radio field pattern defining a predetermined course line, a radio receiver controlled by said field pattern for producing electric signals correlated with the departure of the craft from said course line, a steering device on the craft for controlling the heading of the craft with respect to said course line, a source of follow-up potential, electromechanical follow-up means to balance the potential from said source against said signal to produce a resultant signal for operating said steering device, the last-mentioned means comprising a main balancing control device which is adjustably set to effect a heading correction by said steering device proportional at any given instant to the departure of the craft from said course line and for automatically steering said craft to said course line, and an auxiliary balancing control device which is adjustably set for modifying the action of said main device to automatically maintain the craft on said course line without overshooting thereof and without requiring the craft to be set at any particular heading at the time it enters said radio field pattern.

13. A radio guide system according to claim 12 in which said auxiliary balancing control device increases the effect of said main balancing control device when the initial heading of the craft is away from said course line.

14. A radio guide system according to claim 12 in which a first follow-up motor is provided for operating said main balancing control device in unison with said steering device, and a second follow-up motor is provided for independently operating said auxiliary balancing control device.

15. A radio guide system according to claim 12 in which said main balancing control device comprises a potentiometer resistor and a contact arm therefor and a first motor for operating said contact arm, and said auxiliary balancing control device comprises means carrying said resistor, and another motor for moving said carrying means with respect to said contact arm.

16. A radio guide system according to claim 12 in which said electromechanical means is constituted of a potentiometer resistance having a movable contact arm said resistance and arm forming part of a balancing network, first motor means to move said arm, and second motor means to move said resistance to increase the extent of movement of said arm necessary to balance said network when the initial heading of the craft is away from said course line.

FRANCIS L. MOSELEY.

REFERENCES CITED

The following references are of record in the file of this patent:

UNITED STATES PATENTS

| Number | Name | Date |
|---|---|---|
| 1,958,259 | Becker | May 8, 1934 |
| 2,188,834 | Fischel et al. | Jan. 30, 1940 |
| 2,234,326 | Tiebel | Mar. 11, 1941 |
| 2,257,293 | Thacker | Sept. 30, 1941 |
| 2,261,087 | Jones | Oct. 28, 1941 |
| 2,264,056 | Thacker et al. | Nov. 25, 1941 |
| 2,266,410 | Busignies | Dec. 16, 1941 |
| 2,288,102 | Meredith | June 30, 1942 |
| 2,423,336 | Moseley | July 1, 1947 |